(12) United States Patent
Ishimaru

(10) Patent No.: US 11,759,870 B2
(45) Date of Patent: Sep. 19, 2023

(54) END MILL AND DRILLING METHOD

(71) Applicant: SUBARU CORPORATION, Tokyo (JP)

(72) Inventor: Daisuke Ishimaru, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/847,943

(22) Filed: Apr. 14, 2020

(65) Prior Publication Data

US 2020/0406377 A1 Dec. 31, 2020

(30) Foreign Application Priority Data

Jun. 28, 2019 (JP) .................................. 2019-122537

(51) Int. Cl.
*B23C 5/10* (2006.01)

(52) U.S. Cl.
CPC .......... *B23C 5/10* (2013.01); *B23C 2210/084* (2013.01); *B23C 2220/52* (2013.01)

(58) Field of Classification Search
CPC ...... B23C 2210/0442; B23C 2210/084; B23C 2210/123; B23C 2210/126; B23C 2220/52; B23C 5/10
See application file for complete search history.

(56) References Cited

U.S. PATENT DOCUMENTS

| | | | | |
|---|---|---|---|---|
| 5,609,447 A * | 3/1997 | Britzke | ................... | B23B 51/02 408/144 |
| 5,733,078 A * | 3/1998 | Matsushita | ............ | B23G 5/182 409/74 |
| 6,056,485 A * | 5/2000 | Magill | ...................... | B23C 5/10 407/54 |
| 6,142,716 A * | 11/2000 | Jordberg | ................. | B23C 5/202 407/114 |
| 6,196,770 B1 | 3/2001 | Astrom et al. | | |
| 6,257,810 B1 * | 7/2001 | Schmitt | .................... | B23G 5/18 409/66 |
| 6,652,201 B2 | 11/2003 | Kunimori et al. | | |
| 6,869,259 B2 * | 3/2005 | Lebkuechner | ............ | B23C 3/18 29/557 |
| 6,902,360 B2 * | 6/2005 | Meece | ...................... | B23C 3/00 269/7 |

(Continued)

FOREIGN PATENT DOCUMENTS

| | | |
|---|---|---|
| DE | 10 2013 225 017 A1 | 6/2015 |
| EP | 1 864 736 A2 | 12/2007 |

(Continued)

OTHER PUBLICATIONS

EP 1864736 Machine Translation, pp. 5-9 (Year: 2021).*

(Continued)

*Primary Examiner* — Nicole N Ramos

(74) *Attorney, Agent, or Firm* — Smith, Gambrell & Russell, LLP

(57) ABSTRACT

According to one implementation, an end mill for orbital drilling includes: a shank; a first cutting edge formed in a peripheral portion of the shank; and a second cutting edge formed in a bottom portion of the shank. At least a chamfered edge is formed on a first ridgeline between a first rake face and a first flank of the first cutting edge.

16 Claims, 4 Drawing Sheets

(56) References Cited

U.S. PATENT DOCUMENTS

| | | | | |
|---|---|---|---|---|
| 7,431,538 | B1* | 10/2008 | Ni | B23C 5/10 407/53 |
| 7,588,396 | B2* | 9/2009 | Flynn | B23C 5/10 407/34 |
| 8,142,119 | B2* | 3/2012 | Volokh | B23C 3/02 409/132 |
| 8,714,890 | B2* | 5/2014 | Davancens | B23C 3/02 408/1 R |
| 10,525,540 | B2 | 1/2020 | Shiroma | |
| 11,052,466 | B2 | 7/2021 | Harada et al. | |
| 2003/0180104 | A1* | 9/2003 | Kuroda | B23C 5/10 407/54 |
| 2004/0105729 | A1* | 6/2004 | Giessler | B24B 19/04 407/53 |
| 2008/0152438 | A1* | 6/2008 | Volokh | B23C 5/1009 408/230 |
| 2008/0292415 | A1* | 11/2008 | Kuroda | B23D 35/002 407/61 |
| 2010/0183383 | A1* | 7/2010 | Volokh | B23C 5/10 407/54 |
| 2012/0294689 | A1 | 11/2012 | Yagista | |
| 2015/0367427 | A1* | 12/2015 | Burton | B24B 3/021 407/54 |
| 2016/0082526 | A1* | 3/2016 | Swift | B23C 5/00 407/11 |
| 2019/0366453 | A1* | 12/2019 | Huijs | B23C 5/10 |
| 2020/0353544 | A1* | 11/2020 | Tamaki | B23C 3/00 |

FOREIGN PATENT DOCUMENTS

| | | | | |
|---|---|---|---|---|
| EP | 2 929 966 | A1 | 10/2015 | |
| EP | 3 459 665 | A1 | 3/2019 | |
| JP | S60-048211 | A | 3/1985 | |
| JP | 61159341 | A * | 7/1986 | ........... B23B 27/145 |
| JP | H06-031520 | A | 2/1994 | |
| JP | 94/011142 | | 5/1994 | |
| JP | 2000-107926 | A | 4/2000 | |
| JP | 2001-300813 | A | 10/2001 | |
| JP | 2005-118960 | A | 5/2005 | |
| JP | 2007-044833 | A | 2/2007 | |
| JP | 2007-290105 | A | 11/2007 | |
| JP | 2009226509 | A * | 10/2009 | |
| JP | 2013/027943 | A | 2/2013 | |
| JP | 2014-091168 | A | 5/2014 | |
| WO | 2003/008136 | A1 | 1/2003 | |
| WO | 2004/113002 | A1 | 12/2004 | |
| WO | 2011/093002 | A1 | 8/2011 | |
| WO | 2018/123133 | A1 | 7/2018 | |

OTHER PUBLICATIONS

Extended European Search Report dated Oct. 6, 2020 in European Patent Application No. 20 169 319.9 (9 pages).

Japanese First Office Action dated Mar. 3, 2023 in Japanese Patent Application No. 2019-122537 (3 pages in Japanese with English translation).

Office Action dated Jul. 28, 2023 in European Patent Application No. 20 169 319.9 (6 pages).

* cited by examiner

END MILL AND DRILLING METHOD

CROSS REFERENCES TO RELATED APPLICATIONS

This application is based upon and claims the benefit of priority from Japanese Patent Application No. 2019-122537, filed on Jun. 28, 2019; the entire contents of which are incorporated herein by reference.

FIELD

Implementations described herein relate generally to an end mill and a drilling method.

BACKGROUND

Conventionally, an orbital drilling method is known as one of a drilling method (for example, refer to Japanese Patent Application Publication JP2013-27943 A, International Publication No. WO 94/11142 pamphlet and International Publication No. WO 2003/008136 pamphlet). In the orbital drilling method, a workpiece is drilled by feeding a tool, such as an end mill, in the tool axis direction while not only rotating the tool itself around the tool axis but an orbital motion of the tool around the center axis of a hole to be drilled by offsetting the tool axis by a certain amount. The orbital drilling method has the merit that a hole can be drilled with higher speed and higher quality compared with a general drilling method using a drill and a reamer, in particular, in a case of drilling a workpiece consisting of overlapped different kinds of materials including FRP (fiber reinforced plastics) which is also called a composite material. Accordingly, a machining device dedicated for orbital drilling has also been proposed (for example, refer to International Publication No. WO 2003/008136 pamphlet and International Publication No. WO 2004/113002 pamphlet).

When an end mill is used as a drilling tool for an orbital drilling method, a conventional end mill is used (for example, refer to Japanese Patent Application Publication JPS60-48211 A, Japanese Patent Application Publication JPH6-31520 A, and Japanese Patent Application Publication JP2000-107926 A).

However, in a case of fastening a workpiece by inserting a bolt or the like into a hole of the workpiece drilled by orbital drilling, a problem that fatigue strength of a fastened part deteriorates compared with a case of drilling the workpiece using a drill and a reamer has been reported. In particular, in a case of fastening an aluminum alloy, the deterioration in fatigue strength of a fastened part is remarkable.

For that reason, an object of the present invention is to improve fatigue strength of a hole formed in a workpiece by orbital drilling.

SUMMARY OF THE INVENTION

In general, according to one implementation, an end mill for orbital drilling by which a workpiece is drilled by feeding a tool, in a tool axis direction offset to a central axis of a hole to be drilled, while rotating the tool around the tool axis direction and rotating the tool around the central axis of the hole, is provided. The end mill includes: a shank; a first cutting edge formed in a peripheral portion of the shank; and a second cutting edge formed in a bottom portion of the shank. At least a chamfered edge is formed on a first ridgeline between a first rake face and a first flank of the first cutting edge.

Further, according to one implementation, a drilling method includes producing a drilled product by orbital drilling of the workpiece using the above-mentioned end mill.

DETAILED DESCRIPTION

An end mill and a drilling method according to implementations of the present invention will be described with reference to the accompanying drawings.

(Structure)

Figure 1:
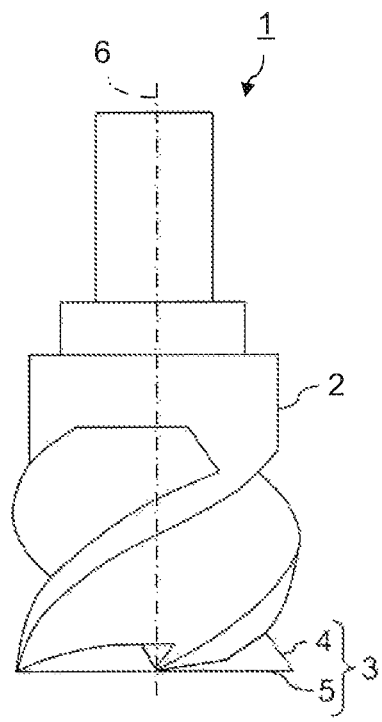
FIG. 1 is a front view showing a shape of an end mill according to an implementation of the present invention.
Figure 2:
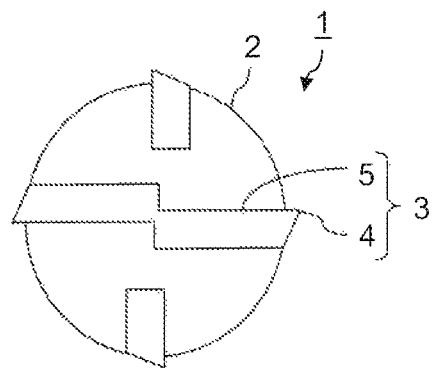
FIG. 2 is a bottom view of the end mill shown in FIG. 1.

FIG. 1 is a front view showing a shape of an end mill according to an implementation of the present invention, and FIG. 2 is a bottom view of the end mill shown in FIG. 1.

An end mill 1 is used as a tool for orbital drilling. Orbital drilling is drilling by which a workpiece is drilled by rotating a tool around the tool axis as the center and giving a feed to the tool in the tool axis direction while the tool is rotated around the center axis of a hole to be drilled as the center by offsetting the tool axis from the center axis of the hole.

The end mill 1 has a shank 2 and cutting edges 3 formed in the shank 2. The cutting edges 3 are formed in each of the peripheral portion and the bottom portion of the shank 2. Henceforth, the first cutting edges formed in the peripheral portion of the shank 2 are called peripheral cutting edges 4 while the second cutting edges formed in the bottom portion of the shank 2 are called bottom cutting edges 5. That is, each cutting edge 3 consists of the peripheral cutting edge 4 formed in the peripheral portion of the shank 2 and the bottom cutting edge 5 formed in the bottom portion of the shank 2.

The radius of the end mill 1 is the maximum distance from a tool axis 6 of the end mill 1 to the tip of the peripheral cutting edge 4 in a direction perpendicular to the tool axis 6. Although the number of the cutting edges 3 is four in an illustrated example, the number of the cutting edges 3 is flexible. Therefore, the number of the cutting edges 3 may be about two to six, similarly to a typical end mill.

Figure 3:
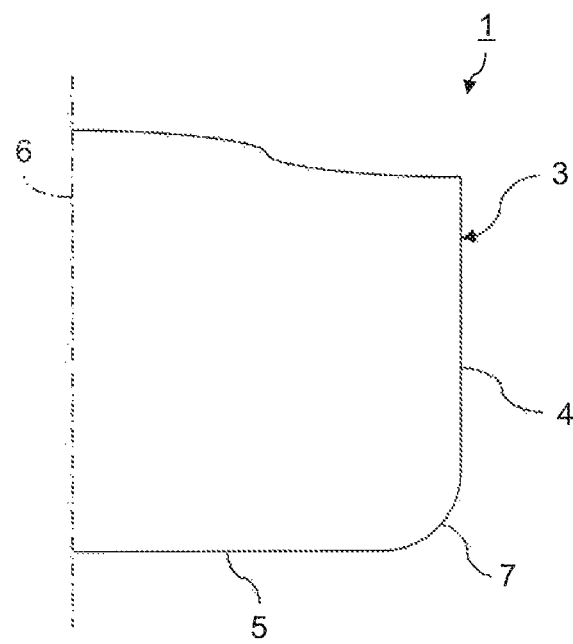
FIG. 3 is a partial enlarged view showing an example of a shape of the boundary portion between the peripheral cutting edge and the bottom cutting edge of the end mill shown in FIG. 1.

FIG. 3 is a partial enlarged view showing an example of a shape of the boundary portion between the peripheral cutting edge 4 and the bottom cutting edge 5 of the end mill 1 shown in FIG. 1.

FIG. 3 draws the peripheral cutting edge 4 shown in FIG. 1 and FIG. 2 linearly by projecting the peripheral cutting edge 4. A honed edge 7 can be formed at the boundary portion between the peripheral cutting edge 4 and the bottom cutting edge 5, as exemplified in FIG. 3, similarly to a typical end mill, although the honed edge 7 has been omitted in FIG. 1 and FIG. 2. As a concrete example, when the diameter of the end mill 1 is not less than 10 mm, the honed edge 7 of which radius is about 3 mm can be formed. Meanwhile, when the diameter of the end mill 1 is less than 10 mm, the honed edge 7 of which radius is about 1 mm to 2 mm can be formed.

The peripheral cutting edge 4 and the bottom cutting edge 5, of which boundaries are the end parts of the honed edge 7 respectively, have shapes different from each other.

Figure 4:
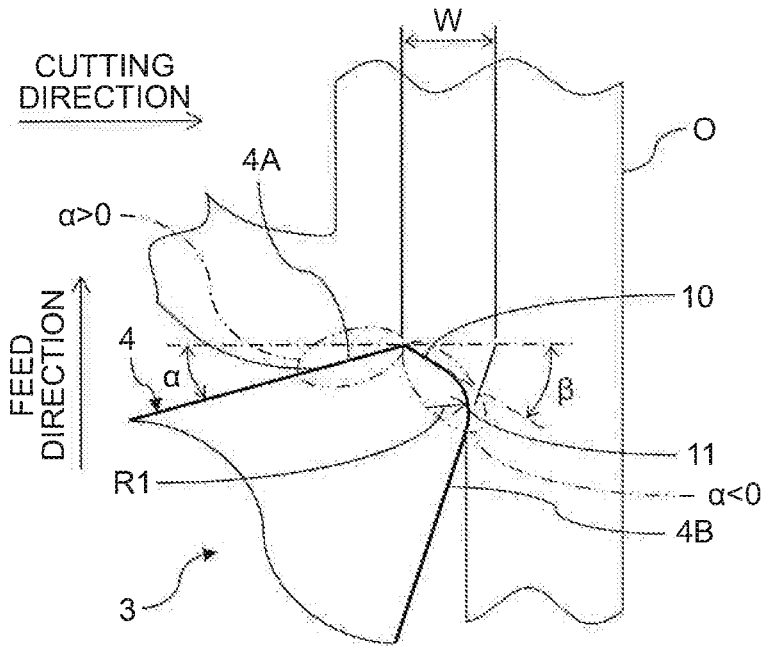
FIG. 4 is a partial enlarged sectional view showing a shape of the tip portion of the peripheral cutting edge shown in FIG. 1 to FIG. 3 together with a workpiece.

FIG. 4 is a partial enlarged sectional view showing a shape of the tip portion of the peripheral cutting edge 4 shown in FIG. 1 to FIG. 3 together with a workpiece O.

At least a chamfered edge (a C-chamfer) 10 is formed on the ridgeline which connects the rake face 4A of the peripheral cutting edge 4 with the flank 4B. More preferably, a honed edge (a round chamfer) 11 is further formed in the flank 4B side of the ridgeline between the rake face 4A and the flank 4B of the peripheral cutting edge 4 while the chamfered edge 10 is formed in the rake face 4A side of the ridgeline, as exemplified in FIG. 4.

Note that, the minute honed edge 11 which is the rounded edge of the peripheral cutting edge 4 is also called a round honing while the minute flat chamfered edge 10 applied to the edge of the peripheral cutting edge 4 is also called a chamfer honing. Generally, a honing, such as a round honing or a chamfer honing, is applied for the purpose of improving the life of a tool by increasing the strength of a cutting edge.

The rake face 4A of the peripheral cutting edge 4 is formed so that the rake angle α of the peripheral cutting edge 4 may become positive ($\alpha>0$). In this case, the rake angle α of the peripheral cutting edge 4 becomes negative ($\alpha<0$) locally in the chamfered edge 10 and a part of the honed edge 11. Accordingly, compression stress is applied to the workpiece O from the chamfered edge 10 and the part of the honed edge 11 of the peripheral cutting edge 4 of which rake angle α becomes negative.

Figure 5:
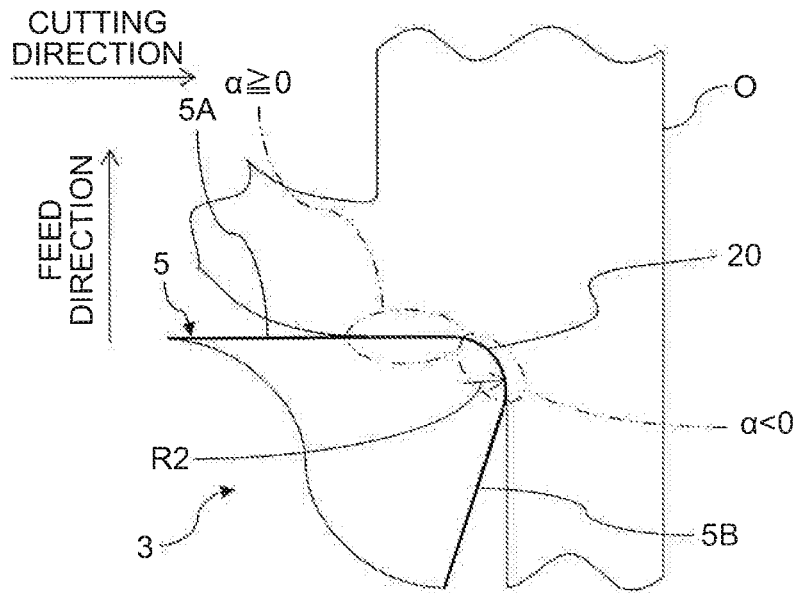
FIG. 5 is a partial enlarged sectional view showing a shape of the tip portion of the bottom cutting edge shown in FIG. 1 to FIG. 3 together with the workpiece.

FIG. 5 is a partial enlarged sectional view showing a shape of the tip portion of the bottom cutting edge 5 shown in FIG. 1 to FIG. 3 together with the workpiece O.

A honed edge 20 is formed as a round honing on the ridgeline which connects the rake face 5A of the bottom cutting edge 5 with the flank 5B. Meanwhile, no chamfer honing is formed on the ridgeline between the rake face 5A and the flank 5B of the bottom cutting edge 5. Moreover, the rake face 5A of the bottom cutting edge 5 is formed so that the rake angle α of the bottom cutting edge 5 may become zero or positive ($\alpha \geq 0$).

Figure 6:
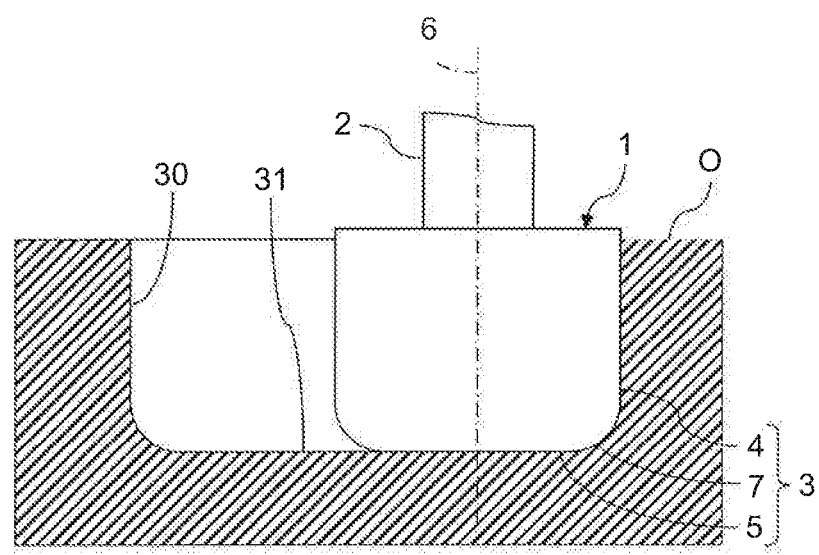
FIG. 6 is a sectional view for explaining a method of orbital drilling of the workpiece by the end mill shown in FIG. 1.

FIG. 6 is a sectional view for explaining a method of orbital drilling of the workpiece O by the end mill 1 shown in FIG. 1.

The end mill 1 exemplified in FIG. 1 to FIG. 5 can be fed in a direction perpendicular to the tool axis 6 while the end mill 1 itself is being rotated around the tool axis 6 with offsetting the tool axis 6 from the central axis of a hole to be drilled of the workpiece O so that the end mill 1 may revolve around the central axis of the hole. In addition, the end mill 1 can be fed in the tool axis direction continuously or intermittently.

As a result, the end mill 1 is moved in parallel while drawing a spiral locus or a locus connecting circles with each other via curved or straight lines. Thereby, a through hole can be formed in the workpiece O. That is, a drilled product can be produced by orbital drilling of the workpiece O using the end mill 1.

A device which gives rotation power for feeding the end mill 1 may be a machine tool, such as a milling machine or a machining center, or may be a hand tool, such as a pneumatic or electric drill driving device. As a matter of course, a machining device dedicated for orbital drilling may be used for orbital drilling with the end mill 1 as a tool.

When orbital drilling is performed with the end mill 1 exemplified by FIG. 1 to FIG. 5, a finished surface 30 of a through hole is formed in the workpiece O by the peripheral cutting edges 4 of the end mill 1 while a worked surface 31 formed by the bottom cutting edges 5 does not remain in the workpiece O.

As mentioned above, the rake angle α is negative in the minute area including the chamfered edge 10 and the part of the honed edge 11 formed at the tip of each peripheral cutting edge 4. Therefore, a distribution of high thrust force is generated at the tip of each peripheral cutting edge 4 while high compressive stress is applied on the finished surface 30 of the through hole. As a result, high compressive residual stress is generated in the finished surface 30 of the through hole.

Meanwhile, the rake angle α is positive in the portion except the minute area at the tip of each peripheral cutting edge 4. Therefore, thrust force does not become so large, and influence on deflection of the end mill 1 and the like is also small.

On the other hand, the cutting resistance generated in the tool axis direction of the end mill 1 can be kept low since any chamfered edge is not formed in the bottom cutting edge 5. As a result, it is prevented that the displacement amount of the end mill 1 in the tool axis direction becomes large, which contributes to improvement in the processing accuracy.

In addition, the honed edge 11 formed on each peripheral cutting edge 4 as a round honing and the honed edge 20 formed on each bottom cutting edge 5 as a round honing have effects that chipping due to the cutting resistance generated in the peripheral cutting edge 4 and the bottom cutting edge 5 can be prevented respectively.

Actually, some end mills of which each tool length is 21 mm, each tool diameter is 20 mm and each cutting edge length is 11 mm have been experimentally produced, and then machining tests of drilling through holes, each having the diameter of 31.75 mm, to the workpieces O each made of an aluminum alloy by orbital drilling which moves the end mills spirally with a machine tool have been conducted. After that, residual stresses generated in the through holes have been measured as indexes of fatigue strength with a commercially available X-ray measuring device.

As a result, it has been confirmed that the residual stress decreased in a case where a through hole was machined by orbital drilling with a typical end mill without a chamfered edge and a honed edge on each peripheral cutting edge, compared with a case where a through hole was machined using a drill and a reamer. Therefore, it can be considered that fatigue strength in the inner surface of a through hole decreases in a case where the through hole is machined by orbital drilling without forming a chamfered edge and a honed edge on each peripheral cutting edge of an end mill, compared with a case where the through hole is machined using a drill and a reamer.

On the other hand, it has been confirmed that the residual stress generated in a through hole increased in a case where orbital drilling was performed by the end mill 1 to which the chamfered edge 10 whose width W as viewed from the feed direction of the end mill 1 was 100 μm has been formed so that the angle β of the chamfered edge 10 to the cutting direction of the workpiece O, i.e., the angle β of the chamfered edge 10 in the rake face 4A side of each peripheral cutting edge 4 might be 10 degrees or 20 degrees, compared with a case where orbital drilling was performed by a typical end mill without a chamfered edge and a honed edge, although the increase amount was not as much as that in a case of drilling using a drill and a reamer Moreover, it has also been confirmed that the residual stress generated in a through hole remained flat in the axis direction and increased only in the circumferential direction in a case where orbital drilling was performed with an end mill on which a chamfered edge has not been formed while a honed edge has been formed so that the radius R1 might be 10 μm or 30 μm, compared with a case where orbital drilling was performed with a typical end mill without a chamfered edge and a honed edge.

Furthermore, it has been confirmed that the residual stress generated in a through hole increased comparably to that in drilling using a drill and a reamer when orbital drilling was performed by the end mill 1 in which the honed edge 20 has been formed on each bottom cutting edge 5 so that the radius R2 might be 30 μm while the honed edge 11 whose radius R1 was 30 μm and the chamfered edge 10 whose width W as seen from the feed direction of the end mill 1 was 100 μm have been formed on each peripheral cutting edge 4 so that the angle β of the chamfered edge 10 to the cutting direction of the workpiece O might be 10 degrees. That is, it has been confirmed that honing which formed the chamfered edge 10 and the honed edge 11 on each peripheral cutting edge 4 could prevent fatigue strength from decreasing due to orbital drilling.

Note that, it is considered that cutting resistance becomes too large when the angle β of the chamfered edge 10 exceeds 30 degrees or the width W of the chamfered edge 10 exceeds 150 μm. Therefore, it is considered that it is appropriate to form the chamfered edge 10 on each peripheral cutting edge 4 so that the angle β of the chamfered edge 10 to the cutting direction of the workpiece O may become larger than 0 degrees and smaller than 30 degrees. Moreover, it is considered that it is appropriate to form the chamfered edge 10 so that the width W as seen from the feed direction of the end mill 1, which is parallel to the finished surface 30 of a through hole, may become not more than 150 μm.

On the other hand, the manufacturable radius R1 of the honed edge 11 as a round honing is about 10 μm, and it is considered that the radius R1 of the honed edge 11 exceeding 30 μm makes cutting resistance too large. Therefore, it is considered that it is appropriate to form the honed edge 11 on each peripheral cutting edge 4 so that the radius R1 may be not less than 10 μm and not more than and 30 μm.

In addition, contrary to expectation, it was also confirmed in the tests that the smaller the radius R1 of the honed edge 11 was, the more compressive residual stress generated in a through hole increased. The reason of increase in residual stress by forming not only the chamfered edge 10 but the honed edge 11 on each peripheral cutting edge 4 is presumed that the range of each peripheral cutting edge 4 whose rake angle α is negative becomes large.

As described above, the end mill 1 has the chamfered edge 10 on each peripheral cutting edge 4 so that fatigue strength of the inner surface of a through hole can be improved in a case where the through hole is formed by orbital drilling. Meanwhile, the drilling method uses the end mill 1, having such a shape, to perform orbital drilling.

(Effects)

Therefore, according to the end mill 1 and the drilling method, compressive residual stress higher than a conventional one can be given to the finished surface 30 of a through hole. Thereby, it becomes possible to use the through hole for fastening a member by a fastener, such as a bolt. That is, fatigue strength of a through hole can be improved so that the development of a fine crack caused by repeated stress applied on the through hole can be suppressed.

In particular, fatigue strength of a through hole formed in an aluminum alloy can be improved. Consequently, a through hole for fastening a fastener can be drilled not only in a workpiece O made of overlapped different kinds of materials including an FRP, such as GFRP (Glass fiber reinforced plastic) or CFRP (Carbon Fiber Reinforced Plastic), but also in a workpiece O including an aluminum alloy. As a result, it becomes possible to adopt an aluminum alloy as a material of an aircraft part or the like, requiring high fatigue strength.

Moreover, a through hole having fatigue strength equivalent to that in a case of drilling by a drill and subsequent finish machining by a reamer can be machined on a workpiece O by forming not only the chamfered edge 10 but the honed edge 11 on the peripheral cutting edge 4. As a result, in a case of drilling a through hole entirely penetrating overlapped members, the merit of orbital drilling that a through hole having a high quality regarding dimensions, surface roughness and the like can be formed at high speed can be utilized while the fatigue strength of a through hole equivalent to that in a case of using a drill and a reamer can be secured.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An end mill for orbital drilling by which a workpiece is drilled by feeding a tool, in a tool axis direction offset to a central axis of a hole to be drilled, while rotating the tool around the tool axis direction and rotating the tool around the central axis of the hole, the end mill comprising:
a shank;
a first cutting edge formed in a peripheral portion of the shank and having a first end and a second end spaced apart in the tool axis direction; and
a second cutting edge formed in a bottom portion of the shank,
wherein at least a chamfered edge is formed on a first ridgeline between a first rake face and a first flank of the first cutting edge with the chamfered edge having a width W that is less than or equal to 150 μm,
wherein the chamfered edge has an angle more than 0° and less than 30° to a cutting direction to the workpiece,
wherein a first honed edge is formed in a first flank side of the first ridgeline, while the chamfered edge is formed in a first rake face side of the first ridgeline and borders a tip of the first cutting edge, wherein the first honed edge has a radius not less than 10 µm and not more than 30 µm, wherein a second honed edge is formed on a second ridgeline between a second rake face and a second flank of the second cutting edge, and wherein the second ridgeline has no chamfered edge, and wherein the first end of the first cutting edge originates at a location coinciding with a most proximal cutting edge region location in the shank, and extends continuously and without interruption on the periphery of the shank to a third honed edge extending between the second end of the first cutting edge and the second cutting edge, and wherein the first rake face defines a positive rake angle in the first cutting edge, and wherein the second rake face defines a zero or positive rake angle in the second cutting edge.

2. A drilling method comprising:
producing a drilled product by orbital drilling of the workpiece using the end mill according to claim 1.

3. The end mill according to claim 1, wherein the first cutting edge extends along an outermost periphery of the peripheral portion and between the first and second ends of the first cutting edge for a length in the tool axis direction that is greater than a length of a maximum radius extending from the tool axis to the outermost periphery of the first cutting edge.

4. The end mill according to claim 3, wherein the maximum radius remains constant between the first and second ends.

5. The end mill according to claim 4, wherein the first cutting edge has a helical configuration.

6. The end mill according to claim 1, wherein a maximum radius from the tool axis to the tip of the first cutting edge remains constant between the first and second ends.

7. The end mill according to claim 6, wherein the first cutting edge has a helical configuration.

8. An end mill for orbital drilling by which a workpiece is drilled by feeding a tool, in a tool axis direction offset to a central axis of a hole to be drilled, while rotating the tool around the tool axis direction and rotating the tool around the central axis of the hole,
the end mill comprising:
a shank;
a first cutting edge formed in a peripheral portion of the shank and having a first end and a second end spaced apart in the tool axis direction; and
a second cutting edge formed in a bottom portion of the shank,
wherein at least a chamfered edge is formed on a first ridgeline between a first rake face and a first flank of the first cutting edge, wherein the chamfered edge has an angle more than 0° and less than 30° to a cutting direction to the workpiece, and wherein the chamfered edge has a width W that is less than or equal to 150 µm, wherein a first honed edge is formed in a first flank side of the first ridgeline, while the chamfered edge is formed in a first rake face side of the first ridgeline and borders a tip of the first cutting edge, wherein the first honed edge has a radius not less than 10 µm and not more than 30 µm, wherein a second honed edge is formed on a second ridgeline between a second rake face and a second flank of the second cutting edge, and wherein the second ridgeline has no chamfered edge, and wherein the first cutting edge extends along an outermost periphery of the peripheral portion and between the first and second ends of the first cutting edge for a length in the tool axis direction that is greater than a length of a maximum radius extending from the tool axis to the outermost periphery of the first cutting edge, and wherein the first rake face defines a positive rake angle in the first cutting edge, and wherein the second rake face defines a zero or positive rake angle in the second cutting edge.

9. The end mill according to claim 8, wherein the maximum radius from the tool axis to the tip of the first cutting edge remains constant between the first and second ends.

10. The end mill according to claim 9, wherein the first cutting edge has a helical configuration.

11. The end mill according to claim 1, wherein the first honed edge extends directly off from the first chamfered edge.

12. The end mill according to claim 1, wherein width W is 100 µm≤W≤150 µm.

13. The end mill according to claim 8, wherein the first honed edge extends directly off from the first chamfered edge.

14. The end mill according to claim 8, wherein width W is 100 µm≤W≤150 µm.

15. The end mill according to claim 1, wherein the first end of the first cutting edge originates at a location coinciding with a most proximal cutting edge region location in the shank, and wherein a maximum radius extending from the tool axis to the outermost periphery of the first cutting edge remains constant along at least a portion of an extension of the first cutting edge extending from the second end toward the first end.

16. The end mill according to claim 8, wherein the first end of the first cutting edge originates at a location coinciding with a most proximal cutting edge region location in the shank, and wherein the maximum radius remains constant along at least a portion of an extension of the first cutting edge extending from the second end toward the first end.

* * * * *